(12) United States Patent
Stefanoski

(10) Patent No.: US 7,626,815 B2
(45) Date of Patent: Dec. 1, 2009

(54) DRIVE BAY HEAT EXCHANGER

(75) Inventor: Zoran Stefanoski, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/273,904

(22) Filed: Nov. 14, 2005

(65) Prior Publication Data

US 2007/0109739 A1 May 17, 2007

(51) Int. Cl.
*H05K 5/00* (2006.01)
*H05K 7/00* (2006.01)

(52) U.S. Cl. .............................. 361/679.47; 361/679.52; 361/679.53; 361/696

(58) Field of Classification Search .................. 361/685, 361/687–689, 690, 697–699, 701–704, 707, 361/709, 679.47, 679.48, 679.52, 679.53, 361/692, 694–696; 174/15.1, 15.2, 16.1, 174/16.3; 257/706, 712, 714, 716, 721, 722
See application file for complete search history.

(56) References Cited

U.S. PATENT DOCUMENTS

| | | | | |
|---|---|---|---|---|
| 5,956,227 | A * | 9/1999 | Kitaoka | 361/695 |
| 6,166,907 | A * | 12/2000 | Chien | 361/699 |
| 6,628,518 | B2 * | 9/2003 | Behl et al. | 361/679.47 |
| 6,667,891 | B2 * | 12/2003 | Coglitore et al. | 361/796 |
| 6,735,080 | B1 * | 5/2004 | Chang | 361/695 |
| 2004/0250992 | A1 * | 12/2004 | Aoki et al. | 165/80.3 |
| 2005/0128705 | A1 * | 6/2005 | Chu et al. | 361/699 |
| 2005/0168939 | A1 | 8/2005 | Iijima et al. | |
| 2005/0199372 | A1 * | 9/2005 | Frazer et al. | 165/80.4 |
| 2005/0231910 | A1 * | 10/2005 | Malone et al. | 361/695 |
| 2005/0259397 | A1 * | 11/2005 | Bash et al. | 361/699 |
| 2006/0146499 | A1 * | 7/2006 | Reents | 361/704 |

FOREIGN PATENT DOCUMENTS

TW 450378 8/2001

OTHER PUBLICATIONS

Summary of Translation of Office Action and Search Report from Taiwan patent office, TW Application Ser. No. 095142155, Apr. 13, 2009 (provided as explanation of relevance of TW 450378).

* cited by examiner

*Primary Examiner*—Jayprakash N Gandhi
*Assistant Examiner*—Anthony M Haughton
(74) *Attorney, Agent, or Firm*—Patterson & Sheridan, LLP

(57) ABSTRACT

The present invention represents a significant advancement in the field of cooling systems for computer hardware. One embodiment of a system for cooling a heat-generating device includes a housing sized to fit within a drive bay of a computing device, a heat exchanger disposed within the housing and configured to transfer heat from liquid to air, a fan disposed within the housing and configured to force air through the heat exchanger, and a pump disposed within the housing and configured to circulate a liquid through a cold plate sub-assembly and back to the heat exchanger. The cold plate sub-assembly is configured to be thermally coupled to the heat-generating device. The disclosed system may be advantageously disposed in any computing device whose chassis has a standard-sized drive bay, thereby enabling the system to be easily implemented across a wide variety of computing devices.

17 Claims, 4 Drawing Sheets

DRIVE BAY HEAT EXCHANGER

BACKGROUND OF THE INVENTION

1. Field of the Invention

This invention relates generally to cooling systems for computer hardware and more particularly to a heat exchanger system that may be implemented within the drive bay of a computing device.

2. Description of the Related Art

Conventional cooling systems for heat generating devices that reside in a computing device, such as central processing units (CPUs) and graphic processing units (GPUs), typically include a heat sink disposed on the processor and a fan to direct air over the heat sink through channels formed by a series of fins disposed on top of the heat sink. In such a design, heat is transferred from the processor, to the heat sink and fins, and to the air flowing through the channels and over the heat sink. The heat is then dissipated into the surrounding environment as the air flows out of the channels and away from the processor.

One drawback of these conventional blower/fan cooling systems is that, as processors become more powerful and generate more heat, the fan has to be operated at very high speeds to generate the airflow through the air channels and over the heat sink necessary to cool the processor. High speed operation tends to produce a substantial amount of unwanted acoustic noise, which is annoying to users of a computer. Also, in some instances, these types of conventional cooling systems may not even be able to meet the heat dissipation requirements of certain high-performance processors. Further compounding these issues is the fact that, while processors are becoming more powerful, the available space for cooling systems within computing devices is generally not increasing. Thus, substantial improvements in the efficiency of cooling systems are required to maintain pace with the evolution of processors.

Liquid cooling systems are beginning to emerge as a viable alternative to conventional blower/fan cooling systems. A liquid cooling system dissipates heat at a much greater rate than a comparable air cooling system. However, there are several challenges that need to be overcome to effectively implement a liquid cooling system in a computer system. First, a liquid cooling system requires more space than an air cooling system. A liquid cooling system typically includes a pump, a reservoir, a fan, a heat exchanger, a cold plate sub-assembly (that is coupled to the processor), and tubing to provide a recirculation path for the cooling liquid. By contrast, an air cooling system normally requires only a fan and a heat sink. Accommodating the increased space requirements of a liquid cooling system may require a larger computer chassis or even locating some of the components outside of the chassis. Further, sizes and layouts of computer chassis tend to vary according to user requirements and preferences. Thus, liquid cooling systems typically require some level of customization and, if sold in a kit, user expertise in locating the components of the cooling system within the computer chassis and installing the tubing.

As the foregoing illustrates, what is needed in the art is a standardized liquid cooling system that may be easily implemented across a wide variety of computing devices.

SUMMARY OF THE INVENTION

In one embodiment, a system for cooling a heat-generating device is provided. The system includes a housing sized to fit within a drive bay of a computing device, a heat exchanger disposed within the housing and configured to transfer heat from liquid to air, a fan disposed within the housing and configured to force air through the heat exchanger, and a pump disposed within the housing and configured to circulate a liquid through a cold plate sub-assembly and back to the heat exchanger. The cold plate sub-assembly is configured to be thermally coupled to the heat-generating device.

The disclosed system may be advantageously disposed in any computing device whose chassis has a standard-sized drive bay, thereby enabling the system to be easily implemented across a wide variety of computing devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF PREFERRED EMBODIMENT(S)

All references to directions in describing parts, such as top and bottom are for convenience and not meant to limit embodiments of the invention in any way.

Figure 1:
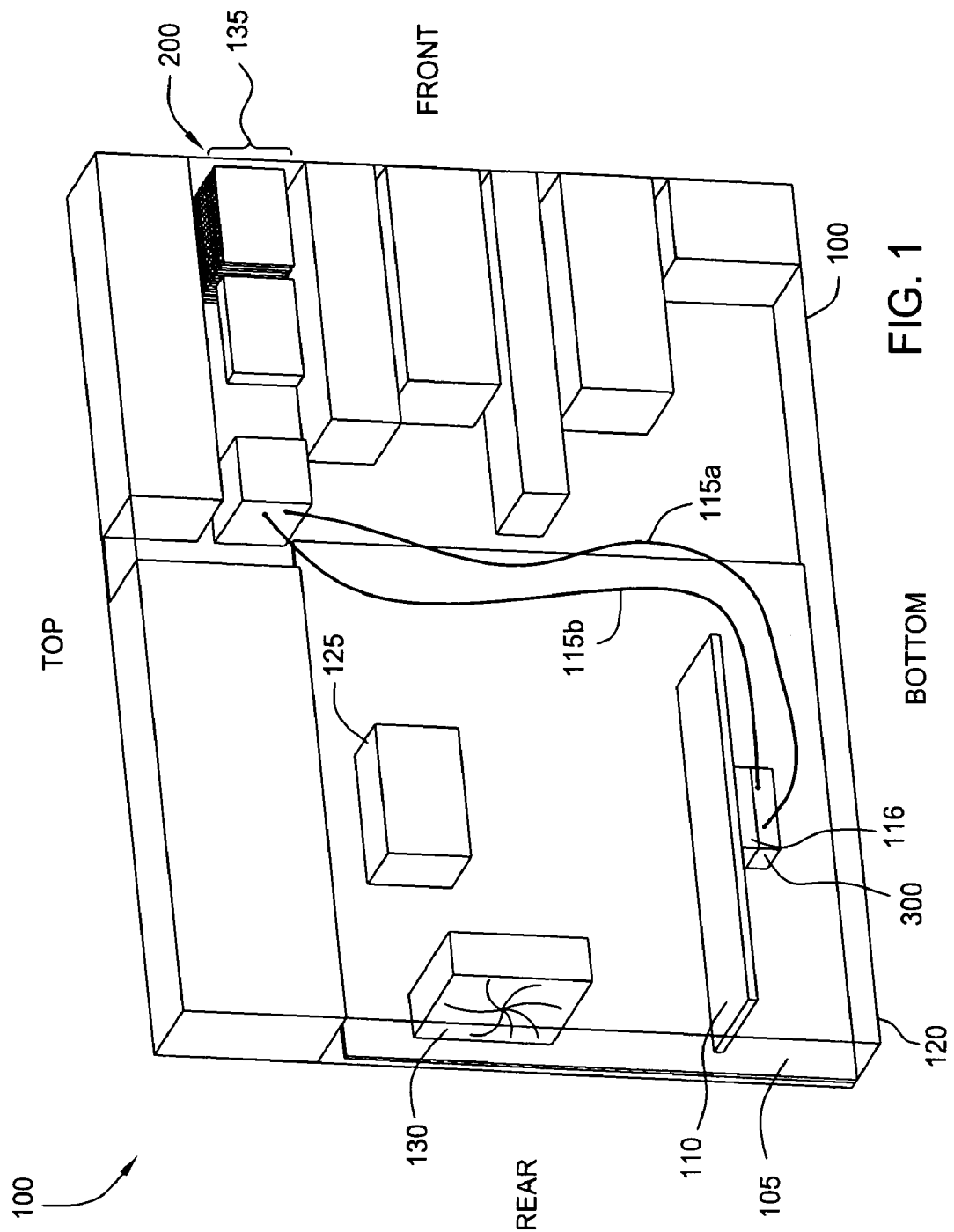
FIG. 1 is a schematic diagram illustrating a computing device that includes a drive bay heat exchanger (DBHA) and a heat-generating device, according to one embodiment of the present invention.

FIG. 1 is a schematic diagram illustrating a computing device 100 that includes a drive bay heat exchanger (DBHA) 200 and a graphics processing unit (GPU) 116, according to one embodiment of the present invention. As shown, the computing device 100 includes a housing 120, within which a motherboard 105 resides. Mounted on the motherboard 105 is a central processing unit (CPU) 125, a system fan 130 for removing heat from computing device 100. Motherboard 105 incorporates a graphics card 110 that enables computing device 100 to process graphics-related data for graphics intensive applications such as gaming applications. Graphics card 110 comprises a printed circuit board (PCB) upon which a plurality of circuit components (not shown), such as memory chips and the like, are mounted. In addition, mounted to one face of graphics card 110 is the GPU 116, which is configured for processing graphics-related data. As described in greater detail herein, computing device 100 may be any type of computing device having a chassis that includes a standard-sized drive bay. For example, computing device 100 may be a desktop or laptop computer, a server or a mainframe computer.

Because the computational requirements of the GPU 116 are typically quite substantial, GPU 116 tends to generate a large amount of heat during operation. If the generated heat is not properly dissipated, the performance of the GPU 116 degrades. For this reason, the DBHA 200 is thermally coupled to the GPU 116 via a cold plate sub-assembly 300 to remove heat from the GPU 116 during operation. As shown in FIG. 1, the cold plate sub-assembly 300 is coupled to the GPU, and tubing 115a,b is connected to both the cold plate sub-assembly 300 and the DBHA 200. A cooling liquid, such as water, brine, antifreeze, a mixture of antifreeze and water, oil, alcohol, mercury or the like, is circulated from the DBHA 200 to the cold plate sub-assembly 300 and then back to the DBHA 200 through the tubing 115,a,b. Heat generated by the GPU 116 is transferred to the cooling liquid as it passes through the cold plate sub-assembly 300. The heat is then carried back to the DBHA 200 by the cooling liquid, where the heat is dissipated into the local environment. In this fashion, heat may be continually or intermittently removed from the GPU 116 during operation, thereby allowing the GPU 116 to remain within a desired temperature range.

Contemplating user upgrade needs, the computer chassis 120 may include one or more spare drive bays 135. The drive bays 135 allow for the installation of additional hard drives, optical drives, floppy disc drives, removable hard drives, etc. Drive bay size is standardized for many types of computing devices. The two most common drive bays sizes for personal computers are the three and a half inch (3.5") size and the five and a quarter inch (5.25") size. The 3.5" size is approximately 4 inches wide, 5.75 inches deep and one inch high, and the 5.25" size is approximately 5.75 inches wide, eight inches deep and 1.63 inches high. Preferably, the DBHA 200 is sized to fit within either of these standard-sized drive bays. Alternatively, the DBHA 200 may be sized to fit other sized drive bays, such as a 3.5" server drive bay or a 2.5" laptop drive bay.

Figure 2A:
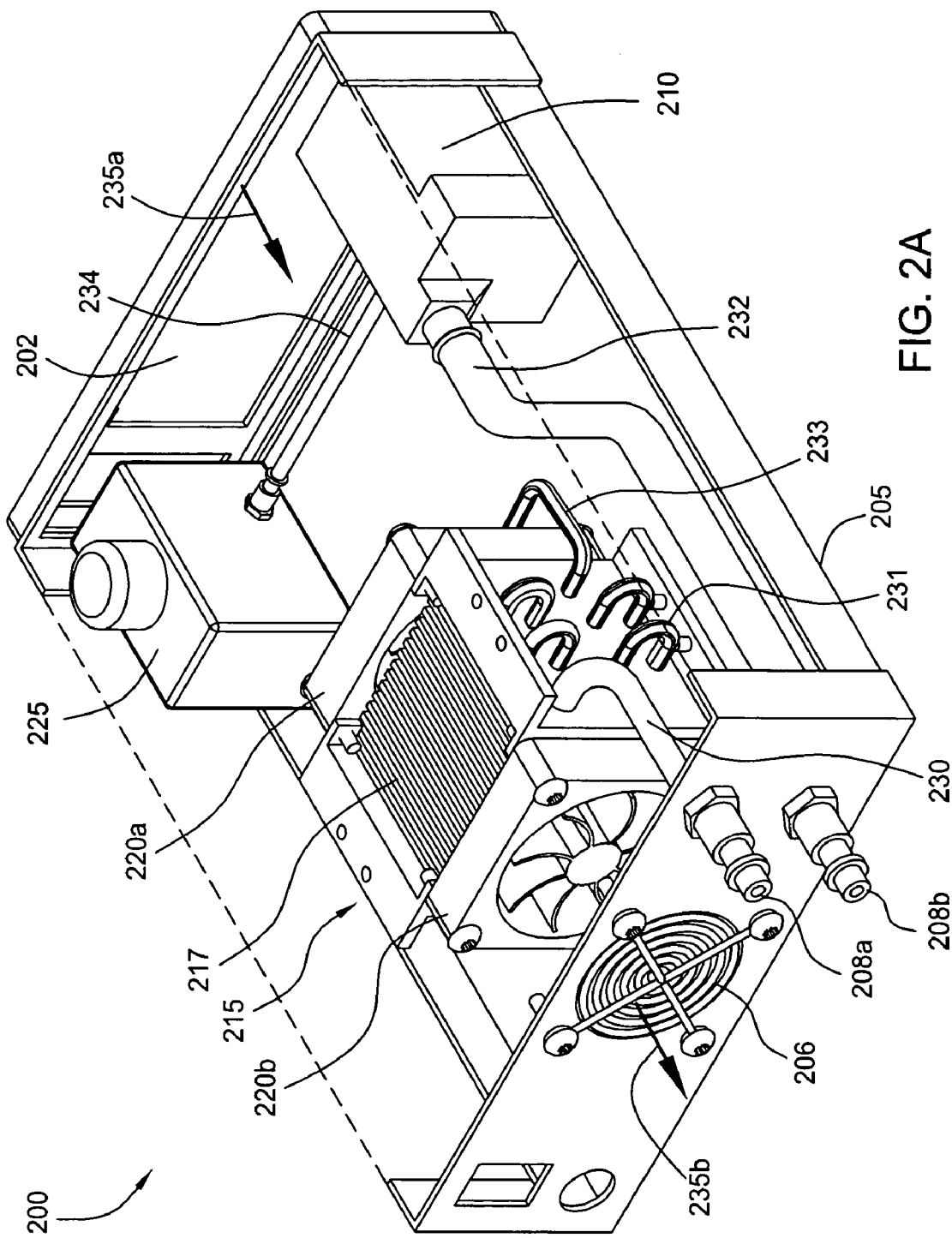
FIG. 2A is one isometric view of the DBHA of FIG. 1, according to one embodiment of the present invention.

FIG. 2A is one isometric view of the DBHA 200, according to one embodiment of the present invention. The DBHA 200 includes a housing 205, pump 210, a heat exchanger 215, intake and exhaust fans 220a,b and a reservoir 225. The housing 205 includes inlet and outlet liquid ports 208a,b to which the tubing 115a,b connects for transporting the cooling liquid to and from the cold plate sub-assembly 300. Inlet port 208a is connected via tubing 230 to an inlet of the heat exchanger 215 and outlet port 208b is connected via tubing 232 to an outlet of the pump 210.

The housing 205 further includes front and rear air passages 202, 206 for the fans 220a,b. Intake fan 220a is configured to draw air from the outside of the chassis 120 through the front passage 202 and to force air through the heat exchanger 215 (depicted by arrow 235a). Exhaust fan 220b is configured to draw air from the heat exchanger 215 and to force air through the rear passage 206 and into the local environment within the computing device 100 (depicted by arrow 235b). The fans 220a,b may be connected directly to the heat exchanger 215 and may be variable-speed and/or controllable by the computing device 100.

The pump 210 is configured to draw the cooling liquid from the reservoir 225 via tubing 234 and then circulate the cooling liquid through the outlet 208b, through the tubing 115a to the cold plate sub-assembly 300, through the cold plate sub-assembly 300, back to the DBHA 200 through the tubing 115b, through the inlet port 208a, through the heat exchanger 215 and then back into the reservoir 225 via tubing 233. Once in the reservoir 225, the cooling liquid may be circulated again through the system. Preferably, the pump 210 is variable-speed and/or controllable by the computing device 100.

The cooling liquid pumped to heat exchanger 215 from the cold plate sub-assembly 300 is routed through the heat exchanger 215 via tubing 231. The heat from the cooling liquid is transferred the tubing 231 to fins 217 that are thermally coupled to the tubing 231. The heat is then transferred to the air forced through the heat exchanger 215 by fans 220a,b and then dissipated into the local environment within the computing device 100. As shown, in one embodiment, the heat exchanger 215 is a "tube and fin" type radiator made from a thermally conductive material, such as aluminum or copper.

Figure 2B:
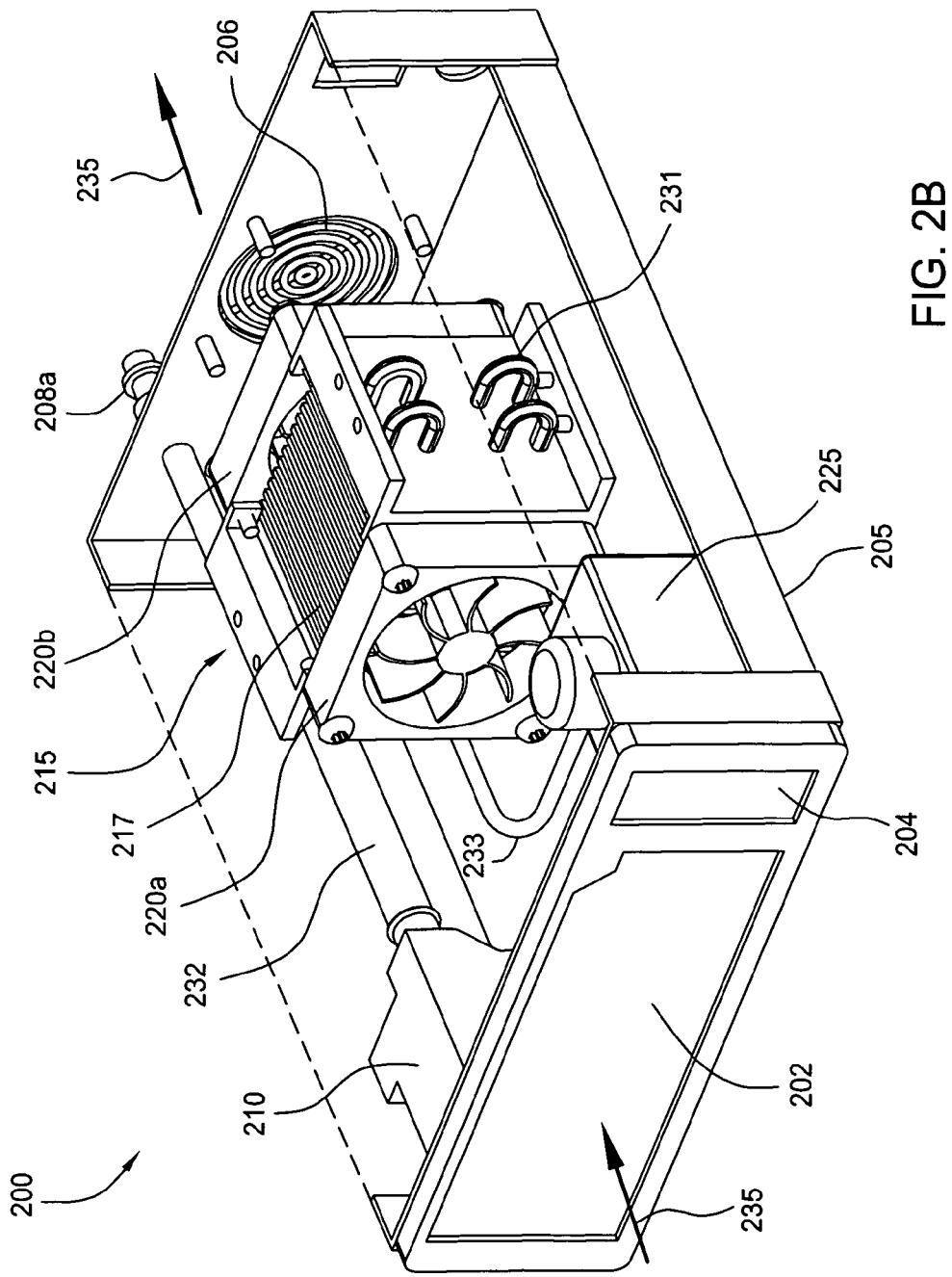
FIG. 2B is another isometric view of the DBHA of FIG. 1, according to one embodiment of the present invention.

FIG. 2B is another isometric view of the DBHA 200, according to one embodiment of the present invention. The housing 205 further includes a window 204 that allows a user to visually monitor the level of cooling liquid in the reservoir 225.

Figure 3:
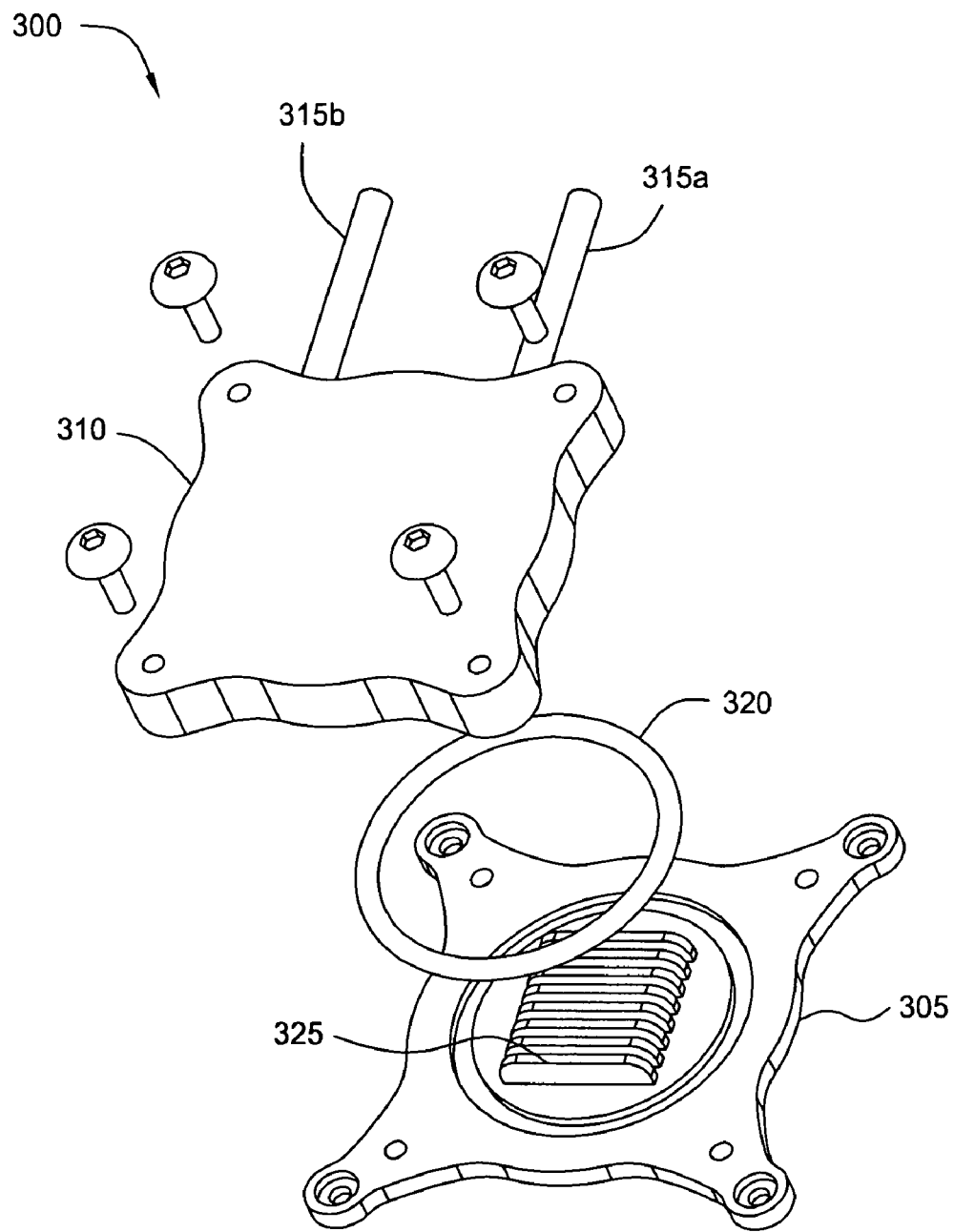
FIG. 3 is an isometric view of a cold plate subassembly that may be used in conjunction with the DBHA of FIG. 1, according to one embodiment of the present invention.

FIG. 3 is an isometric view of the cold plate subassembly 300 that may be used in conjunction with the DBHA 200, according to one embodiment of the present invention. As shown, the cold plate sub-assembly includes a base 305, a cover 310, liquid inlet and outlet ports 315a,b, a plurality of fins 325, and a seal 320. The base 305 and the fins 325 are made from a thermally conductive material, such as aluminum or copper. Disposed at each corner of the base 305 is a foot having a hole therethrough. The holes through the feet correspond with holes in the graphics card 110 for mounting the cold plate subassembly 300 thereon via fasteners (not shown), such as cap screws. The base 305 is securely mounted onto the GPU 116 so that heat may be transferred from the GPU 116 to the base 305. A layer of thermal grease (not shown) may be deposited between the base 305 and the GPU 116 to enhance thermal conduction. The fins 325 are disposed on a top surface of the base 305. The location of the fins 325 on the top surface of the base 305 generally corresponds to the area where the GPU 116 contacts a bottom surface of the base 305. The fins 325 conduct heat from the base 305 and enhance the efficiency of the heat transfer to the cooling liquid by increasing the heat transfer surface area to which the cooling liquid is exposed. The cover 310 is disposed on the top surface of the base 305 and secured thereto by a plurality of fasteners, such as cap screws. The seal 320 is disposed between the cover 310 and the base 305 to prevent the cooling liquid from leaking. The inlet and outlet ports 315a,b connect to the tubing 115a,b such that the cooling liquid enters the cold plate sub-assembly 300 through inlet port 315a, circulates across the top surface of the base 305 and about the fins 325, allowing heat generated by the GPU 116 to transfer to the cooling liquid, and then exits the cold plate sub-assembly 300 through outlet port 315b. The heated cooling liquid then returns to the DBHA 200 where the heat is removed from the cooling liquid, as previously described herein.

The specific design of the cold plate sub-assembly 300 is not essential to the present invention. Thus, in an alternative embodiment, the cold plate sub-assembly 300 may be configured to be disposed on the GPU as well as memory units disposed on the graphics card 110. The cold plate sub-assembly 300 also may be configured to be disposed on the CPU 125. In various other alternative embodiments, the cold plate sub-assembly 300 may be configured to be disposed on other heat-generating devices within the computing device 100, such as a chip set, a hard drive, some other type of special-purpose processing unit or the like.

In yet another alternative embodiment, a hybrid cooling system may be disposed on the GPU 116 (or other heat-generating device) instead of the cold plate sub-assembly 300. The hybrid cooling system is disclosed in U.S. patent appplication Ser. No. 10/822,958, filed on Apr. 12, 2004 and titled, "System for Efficiently Cooling a Processor." The hybrid cooling system includes both a fansink for air cooling a heat-generating device and a hybrid heat transport module to provide additional liquid cooling. The fansink and hybrid heat transport module may operate independently or in combination to dissipate heat from the heat-generating device. The fansink is configured in a manner similar to a conventional fansink designs and includes, a fan, walls, a bottom plate, and a heat sink lid. Heat sink lid, together with walls and bottom plate of the fansink, define a plurality of air channels through which air is forced to remove heat transferred from the heat-generating device. The hybrid heat transport module is adapted to be integrated with the fansink. Hybrid heat transport module is thermally coupled to a portion of the bottom plate of the fansink and includes, a liquid channel as well as a plurality of air channels to compliment the air channels of the fansink. Cooling liquid is circulated through the liquid channel, which thermally coupled to the heat-generating device, thereby allowing heat generated by the heat-generating device to be transferred to the cooling liquid and carried away from the heat-generating device.

In operation, the DBHA 200 has a maximum thermal resistance of approximately 0.23 degrees Celsius per Watt at 13.5 cfm (cubic feet per minute). Thus, the DBHA 200 is able to achieve a maximum heat capture of approximately 160 Watts, while maintaining a processing device temperature of 110 degrees Celsius or less. In addition, the DBHA 200 is designed to stay within standard, maximum sound levels for personal computers—36 decibels at full performance and 27 decibels at idle performance.

In alternative embodiments, if the computer chassis 120 has two available drive bays, then a second DBHA may be added to the second drive bay to increase overall cooling capacity. The second DBHA may be integrated with the DBHA 200 in series or in a parallel. Alternatively, the second DBHA may be used to cool the CPU 125 while the DBHA 200 cools the GPU. In another alternative embodiment, the DBHA 200 may be reconfigured to occupy two drive bays. In another alternative embodiment, cooling capacity may be increased by adding a second heat exchanger or replacing the heat exchanger 215 with a larger heat exchanger to the DBHA 200.

By sizing the DBHA 200 to fit within the spare drive bay 135, the DBHA 200 can be sold in standardized pre-assembled units, thereby eliminating many of the problems of custom design and/or user installation associated with prior art liquid cooling systems.

While the foregoing is directed to embodiments of the present invention, other and further embodiments of the invention may be devised without departing from the basic scope thereof, and the scope thereof is determined by the claims that follow.

The invention claimed is:

1. A system for cooling a heat-generating device, the system comprising:
   a housing sized to fit within a drive bay of a computing device;
   a heat exchanger disposed within the housing and configured to transfer heat from liquid to air;
   a first fan disposed within the housing and coupled to the heat exchanger, wherein the first fan is configured as an intake fan to draw air into the housing from an exterior of the computing device and to force air through the heat exchanger;
   a second fan disposed within the housing and coupled to the heat exchanger, wherein the second fan is configured as an exhaust fan to force the air out of the housing to an interior of the computing device, wherein the first fan is located at one end of the heat exchanger and the second fan is located at an opposite end of the heat exchanger; and
   a pump disposed within the housing and configured to circulate a liquid through a cold plate sub-assembly and back to the heat exchanger, wherein the cold plate sub-assembly is configured to be thermally coupled to the heat-generating device; a second housing sized to fit within a second drive bay of the computing device; and a second heat exchanger disposed within the second housing and configured to transfer heat from liquid to air, wherein the second housing including the second heat exchanger is thermally coupled in series or parallel to the housing including the heat exchanger.

2. The system of claim 1, wherein the cold plate sub-assembly comprises:
   a base made from a thermally conductive material and configured to be disposed on the heat-generating electronic device;
   a cover disposed on the base; and
   a seal disposed between the cover and the base.

3. The system of claim 2, wherein the cold plate sub-assembly further comprises a plurality of fins made from a thermally conductive material and disposed on the base.

4. The system of claim 1, wherein the heat-generating device is a graphics processing unit or a central processing unit.

5. The system of claim 1, wherein the heat-generating device is a graphics processing unit or a central processing unit and an associated chip set.

6. The system of claim 5, wherein the chip set is a memory chip set.

7. The system of claim 1, wherein the drive bay is a standard-size drive bay.

8. The system of claim 1, wherein the drive bay is a 3.5 inch or 5.25 inch size drive bay.

9. The system of claim 1, further comprising a reservoir disposed within the housing.

10. The system of claim 1, wherein the system has a maximum thermal resistance of approximately 0.23 degrees Celsius per Watt at 13.5 cfm (cubic feet per minute).

11. A computing device configured with a liquid cooling system, the computing device comprising:
    a heat-generating device; and
    a heat exchanger sub-system thermally coupled to the heat-generating device that includes:
       a housing sized to fit within a drive bay of a computing device,
       a heat exchanger disposed within the housing and configured to transfer heat from liquid to air,
       a first fan disposed within the housing and coupled to the heat exchanger, wherein the first fan is configured as an intake fan to draw air into the housing from an exterior of the computing device and to force air through the heat exchanger,
       a second fan disposed within the housing and coupled to the heat exchanger, wherein the second fan is configured as an exhaust fan to force the air out of the housing to an interior of the computing device, wherein the first fan is located at one end of the heat exchanger and the second fan is located at an opposite end of the heat exchanger, and
       a pump disposed within the housing and configured to circulate a liquid through a cold plate sub-assembly and back to the heat exchanger, wherein the cold plate sub-assembly is configured to be thermally coupled to the heat-generating device; a second heat exchanger sub-system disposed in a second drive bay of the computing device and thermally coupled to the heat exchange sub-system, wherein the second heat exchanger sub-system is thermally coupled in series or parallel to the heat exchanger sub-system.

12. The computing device of claim 11, further comprising a second heat exchanger disposed in a third drive bay of the computing device and thermally coupled to the heat exchanger sub-system.

13. The computing device of claim 11, wherein the heat-generating device is a graphics processing unit and the second heat generating device is a central processing unit.

14. The computing device of claim 11, wherein the drive bay is a standard-size drive bay.

15. The computing device of claim 14, wherein the drive bay is a 3.5 inch or 5.25 inch drive bay.

16. The computing device of claim 11, wherein the heat exchanger sub-assembly further includes a reservoir disposed within the housing.

17. The computing device of claim 11, wherein the heat exchanger sub-assembly has a maximum thermal resistance of approximately 0.23 degrees Celsius per Watt at 13.5 cfm (cubic feet per minute).

* * * * *